UNITED STATES PATENT OFFICE.

JAMES EDWARD PORTER, OF SYRACUSE, NEW YORK, ASSIGNOR TO THE JUST MINING AND EXTRACTION COMPANY, OF ROCHESTER, NEW YORK, A CORPORATION OF NEW YORK.

METHOD OF TREATING ORES.

1,002,446.  Specification of Letters Patent.  Patented Sept. 5, 1911.

No Drawing.  Application filed January 17, 1910.  Serial No. 538,401.

*To all whom it may concern:*

Be it known that I, JAMES E. PORTER, a citizen of the United States, residing at Syracuse, in the county of Onondaga and State of New York, have invented certain new and useful Improvements in Methods of Treating Ores, of which the following is a specification.

The object of this invention is the provision of a method whereby the values, and particularly the precious metals, may be expeditiously, economically and efficiently recovered from their ores.

According to the invention the finely divided ore or pulp is agitated in a solvent solution, as a cyanid solution, whereby the values are dissolved; and these are then precipitated in presence of the ore pulp in such form that they may be at once withdrawn or separated therefrom, and recovered in form available for further treatment.

In the preferred embodiment of the invention, the values are precipitated by means of plates of aluminum or aluminum alloys, or other forms of the metal presenting extended surfaces of aluminum from which the values may readily be removed.

In the recovery of gold and silver by the cyanid process it has been customary to separate the metal-bearing solution from the ore, and to precipitate the values from the clear solution by the action of zinc, aluminum, metallic alloys or mixtures, or by the action of an electric current. The separation of the solution from the ores involves however very considerable costs and expenditure of time, particularly when the ores are finely subdivided or are treated in the form of slimes: on the other hand, the values are much more quickly and completely dissolved from ores, in a state of very minute subdivision. According to the present invention I am enabled to dissolve the values quickly and with substantial completeness from fine ores or slimes, and to recover such values in available form without the necessity of first separating the solution from the pulp by filtration or sedimentation, and without the use of mercury or other expensive procedure.

I prefer to proceed substantially as follows: The ore is ground in a ball mill or otherwise to extreme fineness, preferably such that 95% or more will pass through a 100 mesh or even a 150 mesh screen. It is then introduced into a dilute solution of caustic soda or other alkali and suspended and agitated therein by means of air as hereinafter described. The purpose of this preliminary treatment is to neutralize the ore and thereby to reduce the consumption of cyanid in the subsequent operations. The concentration of the alkali and the duration of treatment will of course vary with the character of the ore, enough alkali being usually added to insure that a proper proportion of protective alkali, say 1½ to 2 pounds per ton of solution, remains after the preliminary treatment. In the specific illustrative example of the treatment of the gold and silver bearing sulfid ores from the Tonopah district, it has been found that satisfactory results are secured by agitating the ore with a solution containing approximately three ounces of commercial caustic soda for each 80 pounds of water for a period of 10–15 minutes, the weight of ore being about one-half that of the solution. The cyanid is then added and the agitation and aeration continued. For ores containing chiefly gold the cyanid solution may be highly dilute, as is well understood, whereas for ores which carry relatively large proportions of silver, as those from the Tonopah district, a larger proportion of cyanid up to 0.4 per cent. of the weight of the solution, or more, is required.

It is highly important that the aeration of the mixture should be effective, and when, as is preferred, this aeration is effected by means of air, it is important that the air should be introduced into the solution in the form of minute bubbles which thoroughly permeate the mass, remaining suspended therein for long periods, securing the suspension of the fine ore, and maintaining oxidizing conditions around each particle of the ore. Under such conditions sulfid ores are effectively treated in the raw state, the sulfur undergoing oxidation with formation of thiosulfates, as more fully pointed out in my copending application, Ser. No. 538,402, filed January 17, 1910. By this treatment the gold and silver are quickly brought into solution, and the accumulation in the solution of inert or deleterious compounds, as the soluble sulfids or polysulfids, is avoided. The ultimate reaction products of the treatment of such sulfid ores with cyanid solutions, viz., the alkali thiosulfates and hydroxids, are themselves efficient solvents for the values, as pointed out in said application. Any copper present in the ores will also pass into solution. The temperature of the solution is preferably maintained at about 180°–190° F., as the solvent action is thereby greatly accelerated.

As soon as the solution has proceeded to a sufficient extent, for example about one-half hour after the introduction of the cyanid, plates of aluminum or an aluminum alloy are introduced into the suspended pulp or moved therethrough, whereby the values are precipitated and the combined cyanid regenerated. It is necessary merely to observe the precaution that the precipitate should not be permitted to accumulate on the plates to such thickness that it tends to flake or scale off into the pulp, as this would render its re-solution necessary and unduly prolong the operation. The plates are removed, either intermittently by hand or intermittently or continuously by any suitable mechanical device, as a belt, conveyer or the like, and the values are brushed or wiped off, after which the plates are returned to the pulp, this operation continuing so long as values are deposited. When no more values are deposited on the plates the barren solution is separated from the pulp in so far as may be industrially economical by decantation or filtration, and after restoration to its normal strength is applied to the treatment of a fresh batch of ore.

I am aware that aluminum has been proposed as a precipitant for the values from cyanid solutions after the operation of dissolving the values has been completed, the aluminum in this case serving merely as a substitute for zinc, with the advantage that it effects a more nearly perfect restoration of the solution. In such case however the advantages inherent in the present method are not attained, for the reason that during the solution of the values from the ore there is a progressive diminution of the content of active cyanid in the solution, due to the formation of the soluble double cyanids of gold and silver, the action of cyanicids, etc., which must be compensated by the addition of sufficient cyanid to maintain the solvent power: that is to say; the employment of aluminum to precipitate the values does not in such case lessen the consumption of cyanid during the solution or the time required for treatment. According to the present method however the values are precipitated continuously or from time to time as the solution proceeds, and the solution is at the same time regenerated or restored, whereby its solvent power is substantially maintained, the solution proceeds rapidly and relatively small additions of cyanid are required, the additions being merely such as correspond to losses of a mechanical character or those due to the so-called cyanicids. This regeneration of the solution by the action of aluminum may be assumed to proceed in accordance with the following equations:

(1) $2AuKCy_2 + Al = 2Au + 2KCy + 2Cy$.
(2) $2Al + 2KOH + 2H_2O = K_2Al_2O_4 + 5H$.
(3) $2Cy + 2H + 2KOH = 2KCy + 2H_2O$.

That is to say, the aluminum precipitates the gold and silver as metals, liberating some cyanogen; simultaneously a portion of the aluminum dissolves as aluminate with liberation of nascent hydrogen, which in presence of the free alkali re-forms the alkali cyanid.

The method may be practiced in apparatus of various types, that of U. S. Patent No. 887,268, issued May 12, 1908, to J. E. Porter and A. L. Clark, being well adapted for the purpose. The air which aerates the liquid and maintains the fine ore or slimes suspended therein is in this case introduced through a porous bed underlying the solution in such manner that it slowly, gently, uniformly and completely permeates and traverses the mass, without inducing therein such circulation as would abrade the precipitated values from the aluminum plates, an effect which is further dependent upon the fineness of the ore, with the consequent readiness with which it may be suspended and freedom from an abrading action. The precipitate may be wiped from the aluminum plates after their removal with the greatest ease, but is nevertheless desposited on such plates and retained thereby in the midst of the body of suspended aerated and circulating pulp.

In treating ores containing copper the consumption of cyanid is normally high: but even in such case, the use of aluminum regenerates the solution by precipitation of the copper. The copper is in large part dissolved and precipitated before the gold and silver, so that in certain cases at least it is practicable to separate the copper by precipitation on aluminum plates, and to utilize the regenerated solution for the recovery of the precious metals.

While the use of aluminum presents many advantages over that of zinc, particularly in respect to the regeneration or restoration of the solvent power of the solution, and the ease of removal of the precipitated values, and while my invention contemplates primarily the use of aluminum or its alloys for effecting the precipitation, yet it may be advantageous under certain industrial conditions to employ other means of precipitation, as for example plates of zinc, a galvanic couple, or an electrolyzing circuit: and I do not therefore restrict myself to the employment of aluminum where the ore, in a state of minute subdivision, is maintained suspended in the cyanid solution by the introduction thereinto of air in the form of minute bubbles, permeating and oxidizing the mass without establishing such circulation or agitation as to prevent the formation of an adherent and recoverable film or precipitate of the values.

The word "aluminum" as employed in the claims is intended to include such alloys of aluminum as are effective for the precipitation of the values from cyanid solutions.

I claim:

1. The method of recovering precious metals from their ores, which consists in maintaining the fine ore suspended in a cyanid solution, and while so suspended separating the values from said solution upon surfaces of aluminum.

2. The method of recovering precious metals from their ores, which consists in maintaining the fine ore suspended in a heated cyanid solution, and while so suspended separating the values from said solution upon surfaces of aluminum.

3. The method of recovering precious metals from their ores, which consists in maintaining the fine ore in suspension in a cyanid solution by the introduction thereinto of air in minute bubbles, and while so suspended separating the values from said solution.

4. The method of recovering precious metals from their ores, which consists in maintaining the fine ore in suspension in a cyanid solution by the introduction thereinto of air in minute bubbles, and while so suspended separating the values from said solution upon surfaces of aluminum.

5. The method of recovering precious metals from their ores, which consists in subjecting the ores to the solvent action of a cyanid solution, and regenerating said solution during the operation of dissolving the values, by means of aluminum.

In testimony whereof, I affix my signature in presence of two witnesses.

JAMES EDWARD PORTER.

Witnesses:
E. E. CARPENTER,
MICHAEL A. CAHILL.